(12) United States Patent
Lee et al.

(10) Patent No.: US 8,218,491 B2
(45) Date of Patent: Jul. 10, 2012

(54) METHOD OF TRANSMITTING DATA IN WIRELESS COMMUNICATION SYSTEM

(75) Inventors: Young Dae Lee, Anyang-si (KR); Sung Duck Chun, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 12/448,545

(22) PCT Filed: Jan. 9, 2008

(86) PCT No.: PCT/KR2008/000116
§ 371 (c)(1),
(2), (4) Date: Feb. 18, 2010

(87) PCT Pub. No.: WO2008/084969
PCT Pub. Date: Jul. 17, 2008

(65) Prior Publication Data
US 2010/0142456 A1    Jun. 10, 2010

Related U.S. Application Data

(60) Provisional application No. 60/884,401, filed on Jan. 10, 2007.

(51) Int. Cl.
*H04W 4/00* (2009.01)
(52) U.S. Cl. ........ 370/329; 370/320; 370/341; 370/437; 455/434; 455/458
(58) Field of Classification Search ............. 455/450, 455/451, 452.1, 452.2, 464, 509, 515, 458, 455/434; 370/320, 328, 329, 335, 338, 341, 370/342, 437
See application file for complete search history.

(56) References Cited

U.S. PATENT DOCUMENTS

| | | | |
|---|---|---|---|
| 6,470,391 B2 | 10/2002 | Takamoto et al. |
| 6,665,313 B1 | 12/2003 | Chang et al. |
| 6,697,347 B2 | 2/2004 | Ostman et al. |
| 6,765,891 B2 | 7/2004 | Laitinen et al. |

(Continued)

FOREIGN PATENT DOCUMENTS

EP     1 432 261     6/2004

(Continued)

OTHER PUBLICATIONS

"Universal Mobile Telecommunications System (UMTS): User Equipment (UE) procedures in idle mode and procedures for cell reselection in connected mode (3GPP TS 25.304 version 7.1.0 Release 7); ETSI TS 125 304", vol. 3-R2, No. V7.1.0, Dec. 2006, XP014039981.

(Continued)

*Primary Examiner* — Christopher Grey
(74) *Attorney, Agent, or Firm* — McKenna Long & Aldridge LLP (57) ABSTRACT

A data transmission method includes receiving information about a plurality of shared control channels, selecting at least one of the plurality of shared control channels using a User Equipment (UE) identity, receiving a message indicating the use of a shared data channel through the selected shared control channel, and receiving data through the shared data channel according to the message. When receiving a RRC message, such as a RRC connection setup message, transmitted through a shared data channel, a user equipment can decide a shared control channel to be monitored.

5 Claims, 7 Drawing Sheets

U.S. PATENT DOCUMENTS

| | | | |
|---|---|---|---|
| 6,778,501 B1 | 8/2004 | Malmgren et al. | |
| 7,006,464 B1 | 2/2006 | Gopalakrishnan et al. | |
| 7,054,288 B2 * | 5/2006 | Sternberg et al. | 370/329 |
| 7,158,504 B2 | 1/2007 | Kadaba et al. | |
| 7,295,573 B2 | 11/2007 | Yi et al. | |
| 7,359,924 B2 | 4/2008 | Balachandran et al. | |
| 7,542,457 B2 | 6/2009 | Wu | |
| 7,593,694 B2 * | 9/2009 | Michel et al. | 455/70 |
| 7,639,644 B2 * | 12/2009 | Sternberg et al. | 370/329 |
| 7,646,742 B2 | 1/2010 | Petrovic et al. | |
| 7,764,661 B2 | 7/2010 | Heo et al. | |
| 7,801,563 B2 | 9/2010 | Hara et al. | |
| 7,912,471 B2 * | 3/2011 | Kodikara Patabandi et al. | 455/450 |
| 8,054,786 B2 * | 11/2011 | Wu et al. | 370/329 |
| 8,054,788 B2 * | 11/2011 | Ma et al. | 370/329 |
| 8,090,390 B2 * | 1/2012 | Lee et al. | 455/458 |
| 2002/0170013 A1 | 11/2002 | Bolourchi et al. | |
| 2002/0174276 A1 | 11/2002 | Jiang | |
| 2003/0095519 A1 | 5/2003 | Kuo et al. | |
| 2003/0157953 A1 | 8/2003 | Das et al. | |
| 2003/0181221 A1 | 9/2003 | Nguyen | |
| 2003/0210669 A1 | 11/2003 | Vayanos et al. | |
| 2003/0214935 A1 | 11/2003 | Khan et al. | |
| 2003/0231612 A1 | 12/2003 | Kim et al. | |
| 2004/0146067 A1 | 7/2004 | Yi et al. | |
| 2004/0228294 A1 | 11/2004 | Kim et al. | |
| 2004/0266461 A1 | 12/2004 | Beckmann et al. | |
| 2005/0058078 A1 | 3/2005 | Jung et al. | |
| 2005/0068900 A1 | 3/2005 | Stephens et al. | |
| 2005/0083943 A1 | 4/2005 | Lee et al. | |
| 2005/0122898 A1 | 6/2005 | Jang et al. | |
| 2005/0207343 A1 | 9/2005 | Han | |
| 2005/0220116 A1 | 10/2005 | Ahn et al. | |
| 2005/0237960 A1 | 10/2005 | Kim | |
| 2006/0018294 A1 | 1/2006 | Kynaslahti et al. | |
| 2006/0092911 A1 | 5/2006 | Hwang et al. | |
| 2006/0114877 A1 | 6/2006 | Heo et al. | |
| 2006/0140158 A1 | 6/2006 | Terry | |
| 2006/0148411 A1 | 7/2006 | Cho et al. | |
| 2006/0152083 A1 | 7/2006 | Fuhr et al. | |
| 2006/0176811 A1 | 8/2006 | Yang et al. | |
| 2006/0176856 A1 | 8/2006 | Yang et al. | |
| 2006/0203760 A1 | 9/2006 | Fukui et al. | |
| 2006/0245386 A1 | 11/2006 | Hu | |
| 2006/0251019 A1 | 11/2006 | Dalsgaard et al. | |
| 2006/0251105 A1 | 11/2006 | Kim | |
| 2007/0047452 A1 | 3/2007 | Lohr et al. | |
| 2007/0064602 A1 | 3/2007 | Jiang | |
| 2007/0091810 A1 | 4/2007 | Kim et al. | |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1 | 3/2008 | Wu | |
| 2008/0056183 A1 | 3/2008 | Gorokhov et al. | |
| 2008/0084844 A1 | 4/2008 | Reznik et al. | |
| 2008/0101270 A1 | 5/2008 | Kekki et al. | |
| 2008/0101280 A1 | 5/2008 | Gholmieh et al. | |
| 2008/0117891 A1 | 5/2008 | Damnjanovic et al. | |
| 2008/0165724 A1 * | 7/2008 | Wu et al. | 370/320 |
| 2008/0273610 A1 | 11/2008 | Malladi et al. | |
| 2009/0028123 A1 | 1/2009 | Terry et al. | |
| 2009/0268676 A1 | 10/2009 | Wigard et al. | |
| 2010/0091721 A1 | 4/2010 | Larmo et al. | |
| 2011/0190001 A1 * | 8/2011 | Kodikara Patabandi et al. | 455/450 |

FOREIGN PATENT DOCUMENTS

| | | |
|---|---|---|
| EP | 1 724 948 A1 | 11/2006 |
| EP | 1748593 A1 | 1/2007 |
| EP | 1755355 A1 | 2/2007 |
| EP | 1843504 A2 | 10/2007 |
| EP | 1845649 A2 | 10/2007 |
| EP | 1845650 A2 | 10/2007 |
| JP | 2002-247042 A | 8/2002 |
| JP | 2002-527945 | 8/2002 |
| JP | 2002-290413 A | 10/2002 |
| JP | 2003-304574 A | 10/2003 |
| JP | 2005-525065 | 8/2005 |
| JP | 2006-121394 | 5/2006 |
| JP | 2006-148490 A | 6/2006 |
| JP | 2006-237897 A | 9/2006 |
| JP | 2006-524444 | 10/2006 |
| JP | 2006-524969 | 11/2006 |
| JP | 2006-352708 A | 12/2006 |
| JP | 2009-535957 | 10/2009 |
| KR | 10-0404178 B1 | 11/2003 |
| RU | 2004-132193 | 4/2005 |
| RU | 2280327 | 4/2005 |
| RU | 2005-116242 A | 11/2005 |
| RU | 2004-126160 A | 1/2006 |
| WO | WO 97/11566 | 3/1997 |
| WO | WO 98/24250 | 6/1998 |
| WO | WO 00/21253 | 4/2000 |
| WO | WO 02/093296 | 11/2002 |
| WO | WO 03/085874 | 10/2003 |
| WO | WO 03/096149 | 11/2003 |
| WO | WO 03/096567 A1 | 11/2003 |
| WO | WO 2004/017541 | 2/2004 |
| WO | WO 2004/098072 | 11/2004 |
| WO | WO 2004/102836 | 11/2004 |
| WO | WO 2005/119941 | 12/2005 |
| WO | WO 2005/125252 A1 | 12/2005 |
| WO | WO 2006/022876 A1 | 3/2006 |
| WO | WO 2006/052208 A1 | 5/2006 |
| WO | WO 2006/105333 | 10/2006 |
| WO | WO 2006/118418 A2 | 11/2006 |
| WO | WO 2006/118418 A3 | 11/2006 |
| WO | WO 2007/125428 | 11/2007 |

OTHER PUBLICATIONS

"Universal Mobile Telecommunications System (UMTS): High Speed Downlink Packet Access (HSDPA); Overall Description; Stage 2 (3GPP TS 25.308 version 7.1.0 Release 7); ETSI TS 125 308", vol. 3-R2, No. V7.1.0, Dec. 2006, XP014039997.

3GPP TR 25.814 V1.5.0, Myung Cheul, May 2006, V1.5.0, Release 7.

Nokia, "ARQ operation with HARQ-ARQ interaction", 3GPP TSG-RAN WG2 Meeting #55, R2-062765, Oct. 2006.

Ericsson, "Uplink HARQ-ARQ Interactions for NACK → ACK error", 3GPP TSG-RAN WG2 #56, Tdoc R2-063238, Nov. 2006.

Samsung, "MAC functions: ARQ", 3GPP TSG-RAN2 Meeting #51, Tdoc R2-060374, Feb. 2006.

Herrmann et al., "Improving packet loss probability in the UMTS high-speed downlink", Vehicular Technology Conference, 2003. VTC 2003-Fall. 2003 IEEE 58th, vol. 4, pp. 2655-2659, Oct. 2003.

R1-061365, "E-UTRA Downlink Control Signaling—Open Issues", Source: Ericsson, May 8-12, 2006.

R1-062534, "DL Control Channel Structure: Overview", Source: Samsung, Oct. 9-13, 2006.

R1-063177, "Downlink Control Signaling", Source LG Electronics, Nov. 6-10, 2006.

R1-063220, "Control Channel Structure and Coding in E-UTRA Downlink", Source: Texas Instruments, Nov. 6-10, 2006.

R2-061129, "UE Identify in L1/L2 Control Signalling for Downlink Scheduling Resource Allocation", Source: Sharp, May 8-12, 2006.

R2-063684, "Report of E-mail Discussion: DL Scheduling", Source: Rapporteur (Motorola), Dec. 12, 2006.

* cited by examiner

METHOD OF TRANSMITTING DATA IN WIRELESS COMMUNICATION SYSTEM

This application is a national phase entry of International Application No. PCT/KR2008/000116, filed Jan. 9, 2008 and claims priority to U.S. Provisional Application No. 60/884,401 filed Jan. 10, 2007, both of which are hereby incorporated by reference in their entireties.

TECHNICAL FIELD

The present invention relates to wireless communication, and more particularly, to a method for transmitting data in a wireless communication system.

BACKGROUND ART

Wideband Code Division Multiple Access (WCDMA) radio access technology based on 3rd Generation Partnership Project (3GPP) mobile communication system has evolved worldwide. High Speed Downlink Packet Access (HSDPA) that can be defined as the first evolution stage of the WCDMA provides the 3GPP with radio access technology having competitiveness in the mid-term future. However, as the requirements and expectations of users and business providers continuously increase and competitive radio access technology developments are in progress, a new technology evolution in the 3GPP is required for the future competitiveness.

One of systems that are taken into consideration in the post third generation system is an orthogonal frequency division multiplexing (OFDM) system that is able to mitigate inter-symbol interference (ISI) with low complexity. The OFDM system is adapted to transform serial input data symbols into N parallel data symbols and transmit the data symbols with N subcarriers. The subcarriers maintain its orthogonality in the frequency domain. Each orthogonal subcarrier undergoes independent frequency selective fading and the ISI can be canceled through cyclic prefix. Orthogonal frequency division multiple access (OFDMA) refers to realize multiple access by independently providing each user with some of available subcarriers in a system using the OFDM as a modulation scheme. In general, the OFDMA system is adapted to provide frequency resources, called subcarriers, to respective users and provide respective frequency resources to a plurality of users independently so that they are not overlapped with one another. Consequently, the frequency resources are allocated to respective users exclusively.

One or more cells are generally disposed in one base station (BS). A plurality of user equipments (UEs) can be placed in one cell. In general, a UE transmits a radio resource control (RRC) connection request message to the BS in order to gain access to the BS and the BS transmits a RRC connection setup message through a shared data channel. Before establishing the RRC connection, the UE cannot receive any dedicated RRC message. The UE can acquire the RRC connection setup message over a shared data channel by monitoring a shared control channel corresponding to the shared data channel. However, a problem arises because the UE cannot decide which shared control channel is monitored.

DISCLOSURE OF INVENTION

Technical Problem

The present invention provides a data transmission method of selecting a shared control channel that is monitored in order to receive data transmitted over a shared data channel.

Technical Solution

A data transmission method in a wireless communication system according to an aspect of the present invention includes receiving information about a plurality of shared control channels, selecting at least one of the plurality of shared control channels using a user equipment (UE) identity, receiving a message indicating the use of a shared data channel through the selected shared control channel, and receiving data through the shared data channel according to the message.

A data transmission method according to another aspect of the present invention includes selecting at least one of a plurality of shared control channels using a user equipment identity, and receiving data through a shared data channel, which is indicated by the selected shared control channel, by monitoring the selected shared control channel.

Advantageous Effects

A user equipment can select a shared control channel of a plurality of shared control channels using a UE identifier. The UE can receive data through a shared data channel corresponding to the selected shared control channel by periodically monitoring the selected shared control channel. When receiving a RRC message, such as a RRC connection setup message, transmitted through a shared data channel, a user equipment can decide a shared control channel to be monitored.

MODE FOR THE INVENTION

Figure 1:
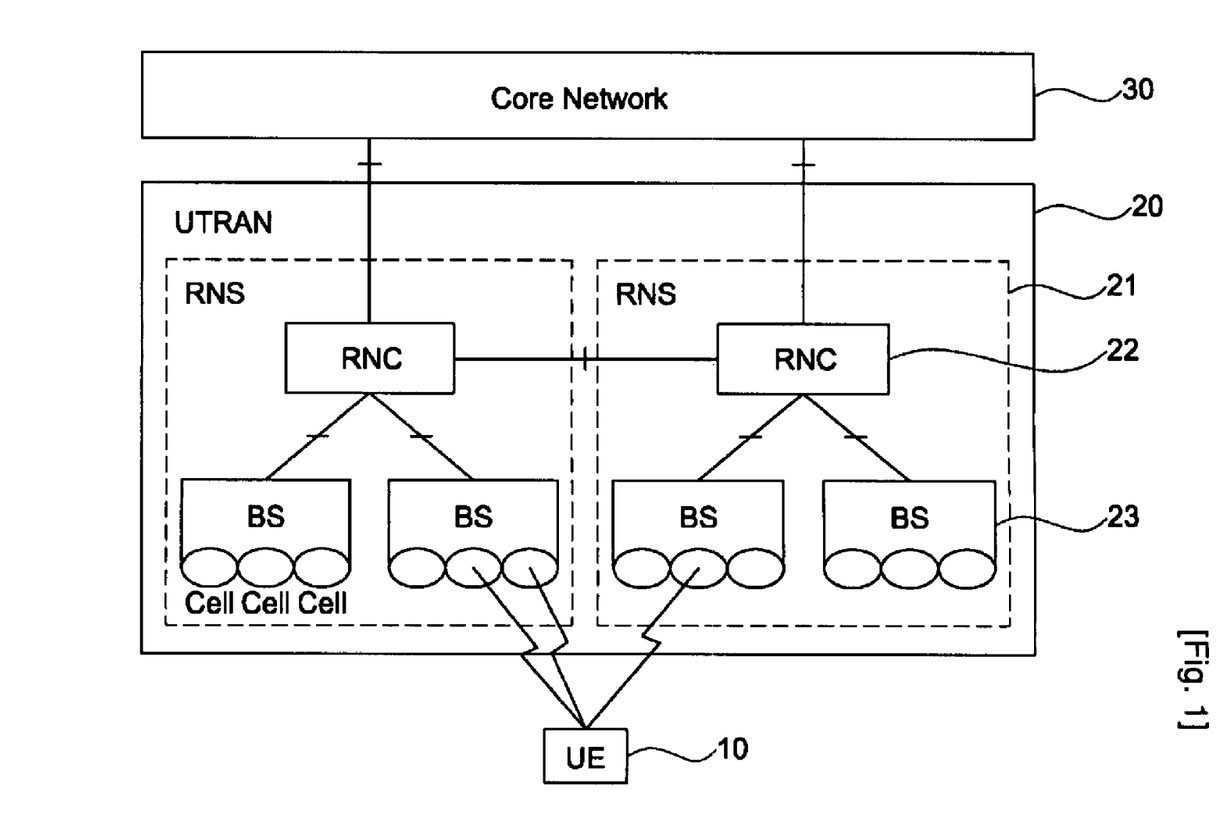
FIG. 1 is a block diagram of a wireless communication system.

FIG. 1 is a block diagram of a wireless communication system. The wireless communication system may be a network configuration of a Universal Mobile Telecommunications System (UMTS). The wireless communication system is widely deployed in order to provide a variety of communication services such as voice and packet data.

Referring to FIG. 1, a UMTS system includes a user equipment (UE) 10, a UMTS Terrestrial Radio Access Network (UTRAN) 20, and a Core Network (CN) 30. The user equipment 10 may be fixed or mobile and also called other terminologies such as a Mobile Station (MS), a User Terminal (UT), a Subscriber Station (SS) and a wireless device. The UTRAN 20 includes at least one Radio Network Sub-system (RNS) 21. Each RNS 21 includes at least one Radio Network Controller (RNC) 22 and at least one Base Station (BS) 23 controlled by the RNC 22. The BS 23 generally refers to a fixed station communicating with the UE 10 and may also be called other terminologies such as eNB (evolved-NodeB), a Base Transceiver System (BTS) and an access point. One or more cells may exist in one BS 23.

An interface for user traffic or control traffic transfer may be used between the BSs 20. Hereinafter, the downlink refers to transmission from the BS 23 to the UE 10, and the uplink refers to transmission from the UE 10 to the BS 23.

Layers of a radio interface protocol between a UE and a network can be classified into L1 (a first layer), L2 (a second layer), and L3 (a third layer) on the basis of three lower layers of an Open System Interconnection (OSI) model which has widely been known in the communication system. A physical layer belonging to the first layer provides information transfer service employing a physical channel, and a RRC layer belonging to the third layer functions to control radio resources between the UE and the network. To this end, the RRC layers exchange RRC messages between the UE and the network.

The radio interface protocol includes a physical layer, a data link layer and a network layer horizontally and is classified into a user plane for user data transmission and a control plane for control signal transmission vertically.

Figure 2:
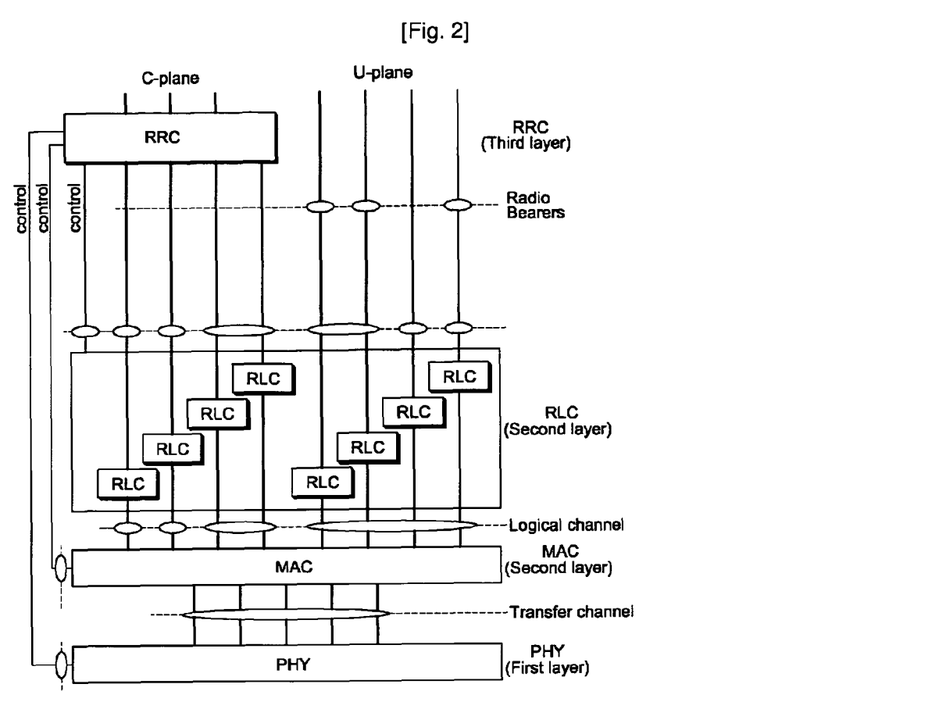
FIG. 2 shows the configuration of a radio protocol.

FIG. 2 shows the configuration of a radio protocol. Radio protocol layers exist in pairs between a UE and a network and are responsible for data transmission over radio interface.

Referring to FIG. 2, a physical (PHY) layer of a first layer functions to transfer data over a radio interface by employing various radio access technologies. The physical layer provides information transfer service to an upper layer using a physical channel. The PHY layer is coupled with a Medium Access Control (MAC) layer (that is, an upper layer) through a transport channel. Data are transferred between the MAC layer and the PHY layer through the transport channel. Data are transferred between different physical layers (that is, a physical layer of a transmitter and a physical layer of a receiver) through the physical channel.

The MAC layer and a Radio Link Control (RLC) layer exist in the second layer. The MAC layer of the second layer provides services to the RLC layer (that is, an upper layer of the MAC layer) through a logical channel. The RLC layer supports a reliable transfer of data and can function to segment and concatenate of a RLC Service Data Unit (SDU) transferred from an upper layer of the RLC layer.

A RRC (Radio Resource Control) layer which is the lowest layer in the third layer is defined only in the control plane and is related to configuring, reconfiguring and release of Radio Bearers (RBs). The RRC layer is responsible for the control of the transport channel and the physical channel. A RB refers to services provided by the second layer for data transfer between a UE and a UTRAN. In general, what the RB is configured refers to a process of defining the properties of a protocol layer and channels necessary to provide a specific service and setting respective detailed parameters and an operation method.

When a RRC layer of a UE and a RRC layer of a UTRAN are interconnected to exchange a RRC message, the UE is in a RRC connected state. On the contrary, when they are not interconnected, the UE is in an idle state. The RRC connection state can be divided into a URA_PCH state, a CELL_PCH state, a CELL_FACH state, and a CELL_DCH state. A UE in the idle state, the URA_PCH state or the CELL_PCH state discontinuously receives a physical channel PICH (Paging Indicator Channel) and a physical channel SCCPCH (Secondary Common Control Physical Channel) which is mapped to a transport channel. PCH (Paging Channel) by employing a Discontinuous Reception (DRX) scheme in order to save power consumption. At this time, the UE is in a sleeping mode during the remaining periods other than when receiving the PICH or SCCPCH. A conventional user equipment that performs the DRX scheme wakes up once every CN domain specific DRX cycle length or UTRAN domain specific DRX cycle length and receives a dedicated Paging Indicator (PI) on the PICH. The dedicated PI is used to inform a UE of transmission of a paging message for the UE through the PCH. The PICH is divided into PICH frames of 10 ms in length, and one PICH frame is comprised of 300 bits. The former part (288 bits) of a PICH frame is used for the dedicated PICH and is used to transfer one or more dedicated PIs. The latter part (12 bits) of the PICH frame is not transmitted. The former part (288 bits) of the PICH is defined as a UE PICH and the latter part (12 bits) thereof is defined as a PICH unused part.

Figure 3:
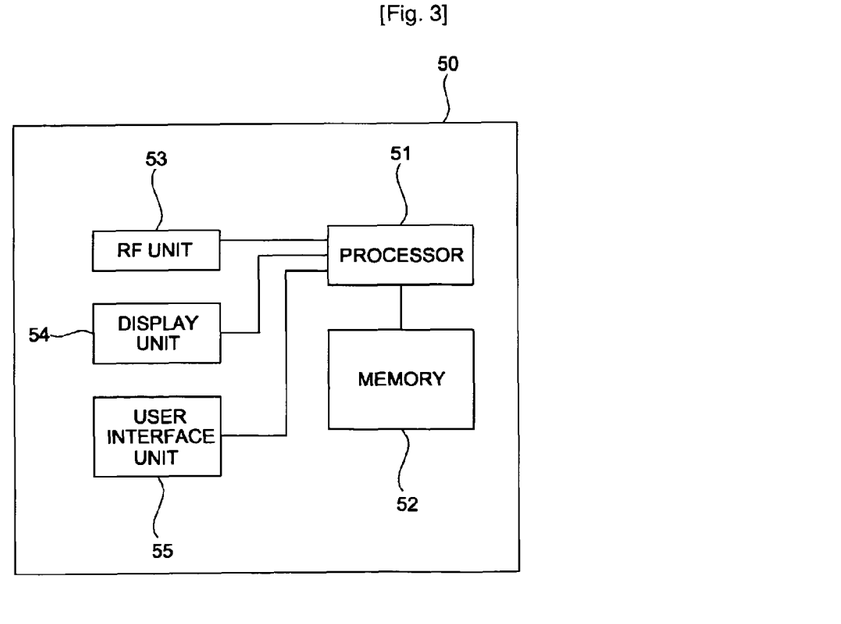
FIG. 3 is a block diagram showing the constituent elements of a user equipment.

FIG. 3 is a block diagram showing the constituent elements of a user equipment.

Referring to FIG. 3, a user equipment 50 includes a processor 51, memory 52, a RF unit 53, a display unit 54, and a user interface unit 55. The processor 51 is implemented using the layers of the radio interface protocol and provides the control plane and the user plane. The function of each layer can be implemented through the processor 51. The memory 52 is connected to the processor 51 and stores a user equipment operating system, applications and general files. The display unit 54 functions to display several pieces of information of the user equipment and may employ a well-known element such as a Liquid Crystal Display (LCD) or an Organic Light Emitting Diode (OLED). The user interface unit 55 may consist of a combination of well-known user interfaces such as the keypad or the touch screen. The RF unit 53 is coupled to the processor and transmits and/or receives radio signals.

Figure 4:
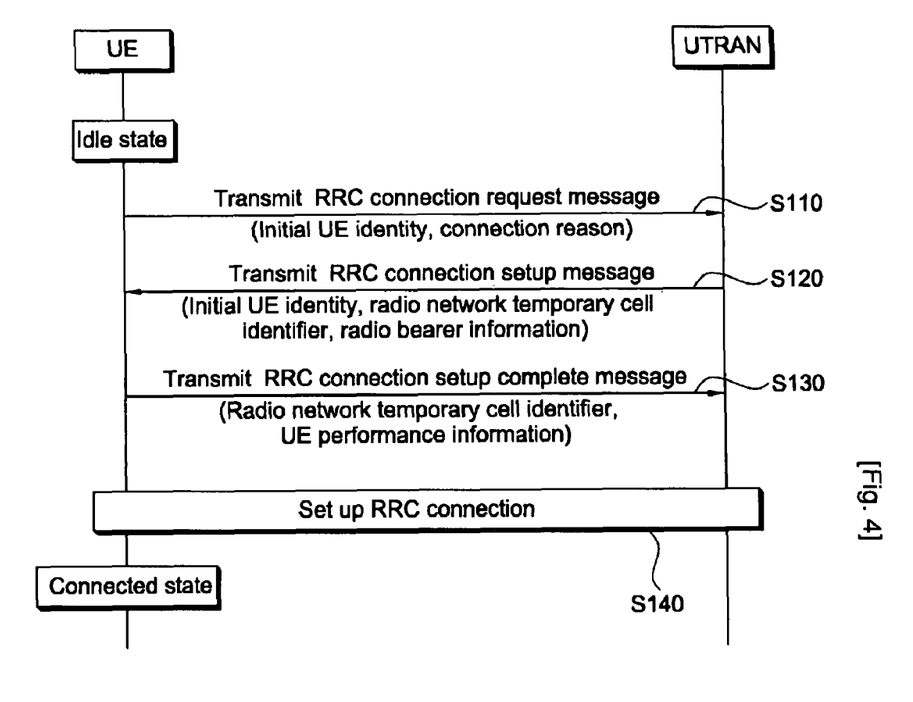
FIG. 4 is a flowchart illustrating an example of a RRC connection procedure.

FIG. 4 is a flowchart illustrating an example of a RRC connection procedure. This figure illustrates the RRC connection procedure in which a UE in the idle state connects to a UTRAN.

Referring to FIG. 4, a UE in a idle state transmits a RRC connection request message to a UTRAN (S110). The RRC connection request message includes a random access preamble identifier for identifying an initial user equipment, a connection reason and so on. Before transmitting the RRC connection request message, the UE can select an random access preamble from available random access preambles and Random Access Channel (RACH) occasion based on system information, which is received from the UTRAN, or information included in a paging message and transmit the selected random access preamble to the UTRAN.

The UTRAN transmits a RRC connection setup message to the UE (S120). The RRC connection setup message includes a random access preamble identifier, a radio network temporary cell identifier, radio bearer information and so on.

The UE transmits a RRC connection setup complete message to the UTRAN (S130). The RRC connection setup complete message includes a radio network temporary cell identifier, user equipment performance information, etc. The UE is in a RRC connected state after RRC connection setup between the user equipment and the UTRAN is completed (S140).

A channel for data and control information is described below.

Figure 5:
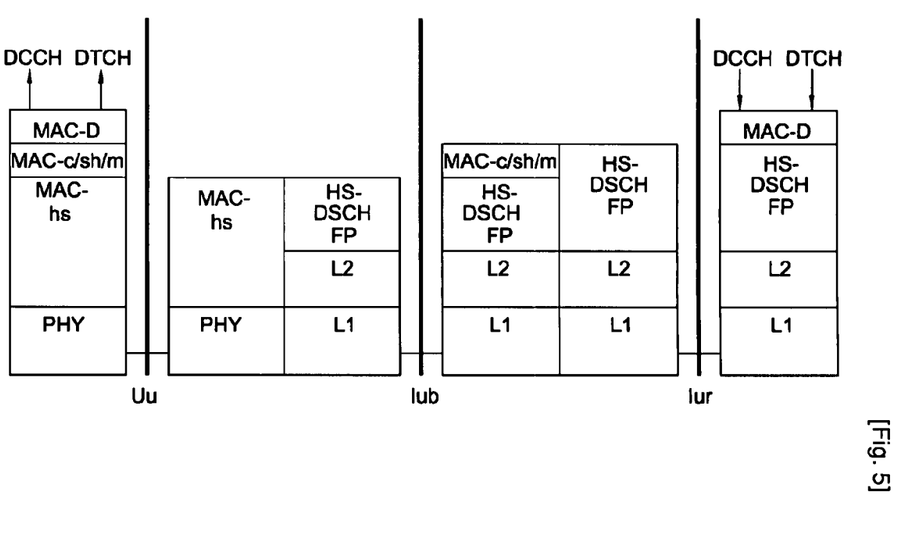
FIG. 5 is a block diagram showing the protocol stack of a High Speed-Downlink Shared Channel (HS-DSCH).

FIG. 5 is a block diagram showing the protocol stack of a HS-DSCH.

Referring to FIG. 5, a data unit transferred from the RLC layer of a Serving RNC (SRNC) is transferred to a MAC-d entity, which manages a dedicated channel, through a logical channel Dedicated Traffic Channel (DTCH) or Dedicated Control Channel (DCCH). The data unit is then transferred to MAC-hs of the BS through MAC-c/sh/m of a control RNC (CRNC). The MAC-d is a MAC entity to manage a dedicated channel, the MAC-c/sh/m a MAC entity to manage a common channel, and the MAC-hs is a MAC entity to manage a High Speed-Downlink Shared Channel (HS-DSCH).

A transport channel HS-DSCH is used to transfer high-speed data to a user equipment. The HS-DSCH has the length of 2 ms Transmission Time Interval and includes three slots. The HS-DSCH supports a variety of Modulation Code Sets (MCSs) for achieve high data rate. The HS-DSCH can select the most suitable a MCS according to channel conditions and transfer data at an optimal throughput. To this end, the HS-DSCH can adopt hybrid automatic repeat request (HARQ) scheme in which automatic repeat request (ARQ) scheme and channel coding scheme are combined. The HARQ scheme enables reliable data transfer.

Figure 6:
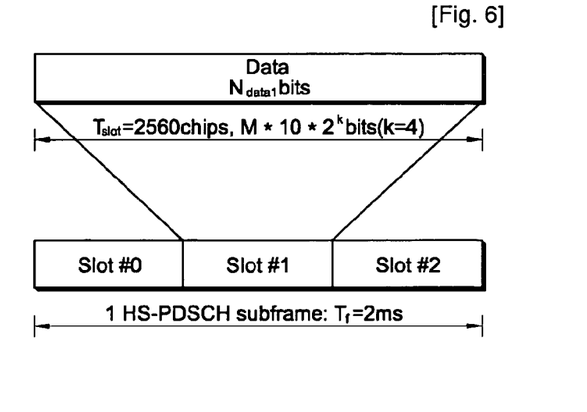
FIG. 6 is a block diagram showing the configuration of a subframe of a High Speed-Physical Downlink Shared Channel (HS-PDSCH).

FIG. 6 is a block diagram showing the configuration of a subframe of a High Speed-Physical Downlink Shared Channel (HS-PDSCH).

Referring to FIG. 6, a subframe of the HS-PDSCH includes three slots and has the length of 2 ms TTI. One slot includes 2560 chips and has a length of $M*10*2^k$ bits (k=4).

Quadrature Phase Shift Keying (QPSK) or 16-Quadrature Amplitude Modulation (16-QAM) modulation symbols can be transmitted through the HS-PDSCH. M designates the bit number per modulation symbol. In the case of QPSK, M=2 and in the case of 16 QAM, M=4.

The physical channel HS-PDSCH is used to transfer a HS-DSCH (that is, the transport channel). The HS-PDSCH has a spreading factor fixed to 16 and corresponds to one channelization code, which is selected in a channelization-code-set reserved for HS-DSCH data transfer. When multiple codes are transmitted to one user equipment, a plurality of channelization codes is allocated during the same HS-PDSCH subframe.

Figure 7:
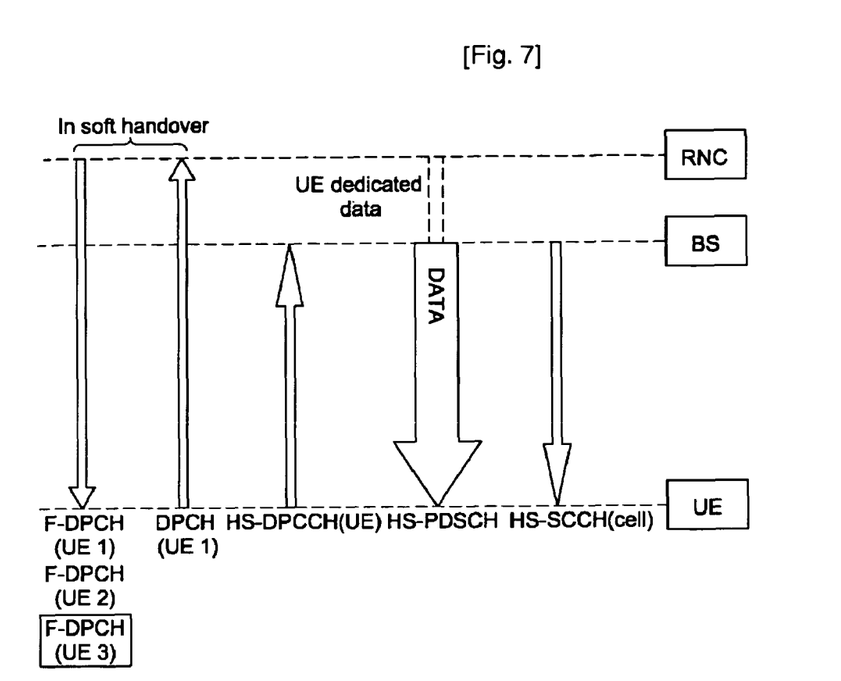
FIG. 7 is a block diagram showing the configuration of a channel.

FIG. 7 is a block diagram showing the configuration of a channel.

Referring to FIG. 7, to transmit user data through a HS-DSCH, transmission of HS-DSCH control information is required. The HS-DSCH control information is transmitted through a downlink HS-SCCH (High Speed-Shared Control Channel) or an uplink HS-DPCCH (High Speed-Dedicated Physical Control Channel). A Dedicated Physical Channel (DPCH) is a bi-directional physical channel and is mapped to a transport channel DCH. The DPCH is used to transfer dedicated data, and dedicated L1 control information such as a power control signal necessary for closed loop power control. A Fractional Dedicated Physical Channel (F-DPCH) is a downlink channel and is a physical channel used to transmit several DPCH using one channel code. Dedicated data for several user equipments are not transferred through one F-DPCH, and the F-DPCH is used to transfer dedicated L1 control information of a plurality of user equipments together, such as a power control signal necessary for closed loop power control. When the downlink F-DPCH exists, an uplink DPCH operates in conjunction with the downlink F-DPCH. In the F-DPCH, a UE1, a UE2 and a UE3 use one channel code together. At this time, each UE is equipped with the DPCH as the uplink.

Figure 8:
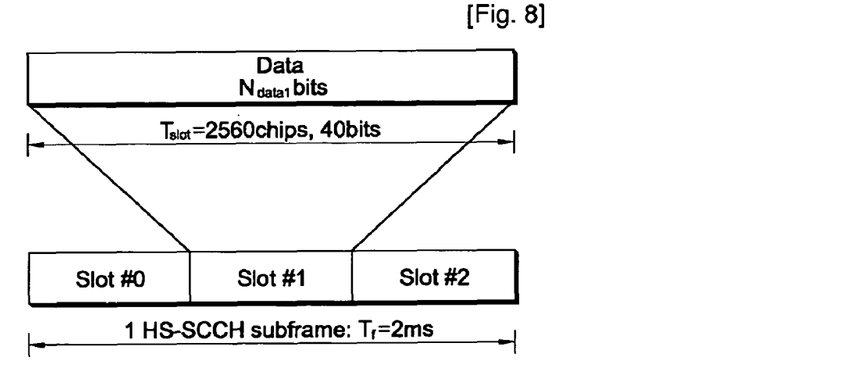
FIG. 8 is a block diagram showing the configuration of a subframe of a High peed-Shared Control Channel (HS-SCCH).

FIG. 8 is a block diagram showing the configuration of a subframe of the HS-SCCH.

Referring to FIG. 8, a subframe of the HS-SCCH includes three slots and has the length of a 2 ms TTI. One slot can have a 40-bit length, i.e., 2560 chips. The downlink HS-SCCH has a spreading factor 128. The HS-SCCH is a downlink physical channel having the transfer rate of 60 kbps. Information transmitted through the downlink HS-SCCH can be largely classified into Transport Format and Resource related Information (TFRI) and HARQ related information. UE identity (H-RNTI) information to inform whether transmitted information is user information is also transmitted through the HS-SCCH.

An example of information transmitted through the downlink HS-SCCH is listed in Table 1.

TABLE 1

|  | Information | Value |
| --- | --- | --- |
| TFRI Information | Channelization-code-set information (7 bits) | $X_{ccs,1}, X_{ccs,2}, \ldots, X_{ccs,7}$ |
|  | Modulation scheme information (6 bits) | $X_{ms,1}$ |
|  | Transport-block size information (6 bits) | $X_{tbs,1}, X_{tbs,2}, \ldots, X_{tbs,6}$ |
| HARQ Information | Hybrid-ARQ process information (3 bits) | $X_{hap,1}, X_{hap,2}, X_{hap,3}$ |
|  | Redundancy and constellation version (3 bits) | $X_{rv,1}, X_{rv,2}, X_{rv,3}$ |
|  | New data indicator (1 bit) | $X_{nd,1}$ |
| UE ID Information | UE identity (16 bits) | $X_{ue,1}, X_{ue,2}, \ldots, X_{ue,16}$ |

The TFRI information includes the channelization-code-set information $X_{ccs}$, the modulation scheme information $X_{ms}$ and the transport-block size information $X_{tbs}$. The HARQ information includes the HARQ process information $X_{hap}$, the Redundancy and constellation Version (RV) $X_{rv}$ and the new data indicator $X_{nd}$. The UE ID information includes the UE identity $X_{ue}$.

Figure 9:
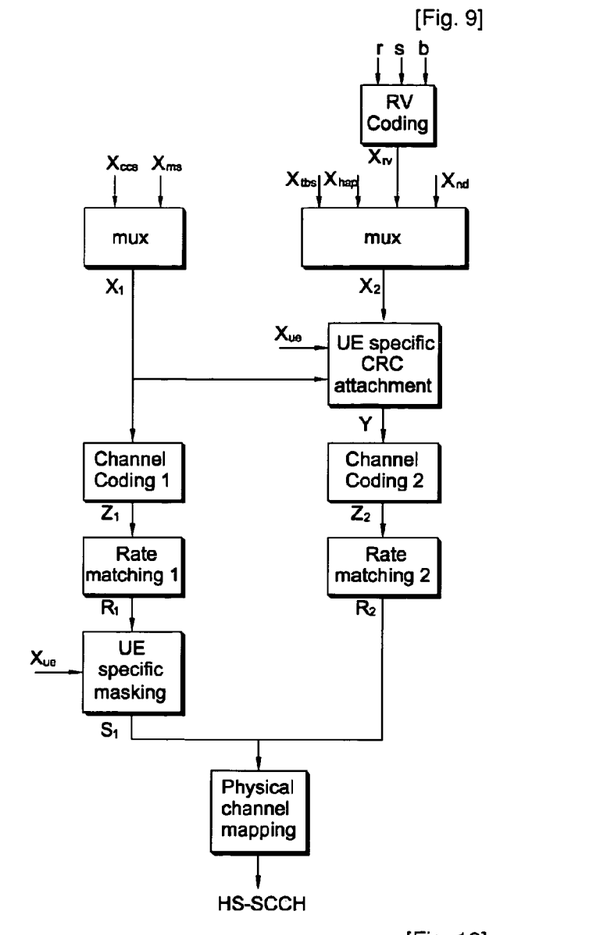
FIG. 9 is a block diagram showing coding of the HS-SCCH.

FIG. 9 is a block diagram showing coding of the HS-SCCH.

Referring to FIG. 9, a multiplexed information $X_1$ is generated by multiplexing $X_{ccs}$ and $X_{ms}$. The multiplexed information $X_1$ experiences channel coding 1 to generate a first codeword $Z_1$. The data rate of $Z_1$ is rate-matched by rate matching 1 to generate a rate-matching block $R_1$. UE specific masking is performed on the $R_1$ using $X_{ue}$ to generate a masked unit $S_1$.

RV parameters r, s, and b are conjugated and undergo RV (Redundancy Version) coding, thus producing $X_{rv}$, $X_{tbs}$, $X_{hap}$, $X_{rv}$ and $X_{nd}$ are are multiplexed to generate $X_2$. A UE specific CRC is attached to the $X_2$ to generate Y. Channel coding 2 is performed on Y to generate $Z_2$. The data rate of $Z_2$ is rate-matched by rate matching 2 to generate $R_2$. $S_1$ and $R_2$ are mapped to a physical channel which is the HS-SCCH.

Figure 10:
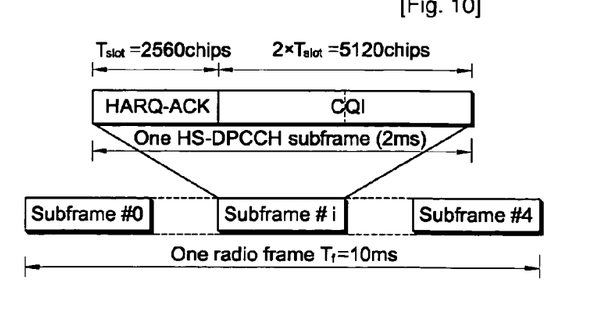
FIG. 10 is a block diagram showing the frame format of a High Speed-Dedicated Physical Control Channel (HS-DPCCH).

FIG. 10 is a block diagram showing the frame format of a HS-DPCCH (High Speed-Dedicated Physical Control Channel).

Referring to FIG. 10, an uplink HS-DPCCH transmits an uplink feedback signaling, related to data transfer through a downlink HS-DSCH. The HS-DPCCH is a dedicated channel for a specific UE and operates in conjunction with an uplink and downlink DPCH (Dedicated Physical Channel). The feedback signaling is comprised of ACK (Acknowledgement)/NACK (Negative Acknowledgement) signal for HARQ and CQI (Channel Quality Indicator). A frame of the HS-DPCCH includes five subframes of 2 ms in length. Each subframe includes three slots. The ACK/NACK signal is transmitted through the first slot of the HS-DPCCH subframe, and the CQI is transmitted through the second and third slots of the HS-DSCH subframe. The HS-DPCCH is always transmitted together with the uplink DPCCH. The CQI is information on the downlink radio channel. The CQI is measured by the UE through a downlink Common Pilot Channel (CPICH) and sent to the BS. The ACK/NACK signal informs ACK or NACK information about user data packets which are transmitted through the downlink HS-DSCH according to a HARQ mechanism.

Hereinafter, a RRC connection procedure through the above channels is described.

A network informs a HS-SCCH, which is monitored by each UE, through a RRC signal. The network informs a UE of one or more HS-SCCHs, which must be monitored by a pertinent UE, by sending a UE dedicated RRC message to the UE through the DCCH. Thus, HS-SCCHs that must be monitored by the UE are decided based on the information of the RRC message informed by the network with no any rules. The UE monitors one or more HS-SCCHs indicated by the RRC message.

In order to enter into a RRC connected state, a UE sends a RRC connection request message to a network. The network sends a RRC connection setup message to the UE through a CCCH. When the RRC connection setup message is sent through a HS-DSCH, the network informs, through a HS-SCCH, the UE of the transmission of the message through the HS-DSCH. Before establishing a RRC connection, the UE cannot receive a RRC message. Accordingly, when receiving the RRC message such as the RRC connection setup message, which is transmitted through the CCCH, through the HS-DSCH, a problem arises because the UE does not decide which HS-SCCH has to be monitored.

Figure 11:
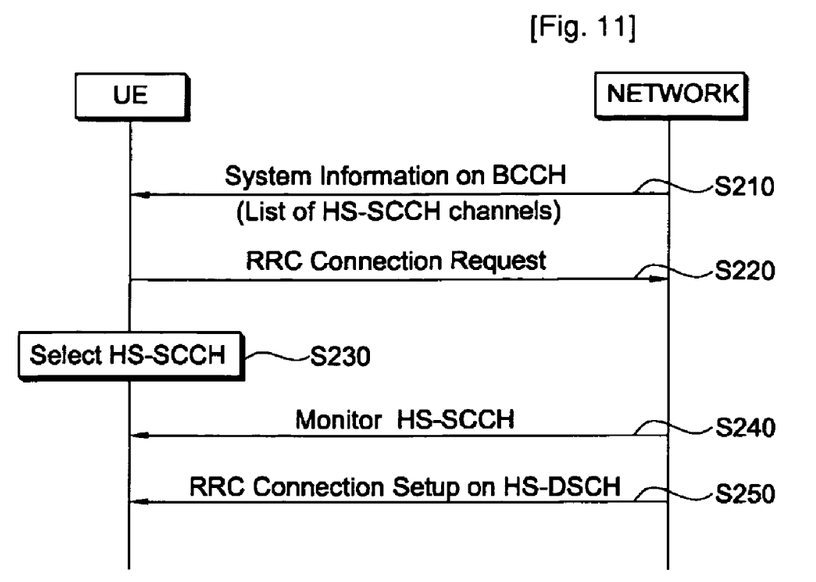
FIG. 11 is a flowchart illustrating a method of performing a RRC connection procedure according to an embodiment of the present invention.

FIG. 11 is a flowchart illustrating a method of performing the RRC connection procedure according to an embodiment of the present invention.

Referring to FIG. 11, a UE receives system information from a network (S210). The system information can be received through a broadcasting channel. The system information includes information about a plurality of shared control channels. The shared control channel is a physical channel for transmitting control information regarding the reception of data through a shared data channel. The shared control channel may be a HS-SCCH. The shared data channel may be a HS-DSCH, which is shared by several UEs in order to receive data. The system information includes information about a plurality of HS-SCCHs. The UE can obtain information about the plurality of HS-SCCHs based on the system information.

The UE transmits a RRC connection request message to the network (S220). Before transmitting the RRC connection request message, the UE can sends a random access preamble on a random access channel (RACH) to request radio resources for the RRC connection request message.

The UE selects one or more HS-SCCHs, which is monitored, using its UE identity (S230). In other words, the UE selects a specific one of a plurality of shared control channels using the UE identity in order to receive messages, which are transmitted through a common channel, through a shared data channel. The UE identity may be one of IMSI (International Mobile Station Identity), TMSI (Temporary Mobile Subscriber Identity), RNTI (Radio Network Temporary Identity) and so on. Indices can be assigned to the plurality of HS-SCCHs in the system information. The UE can find out the index of the selected HS-SCCH according to the following equation:

$$\text{HS-SCCH index} = \text{UE identity} \bmod K \qquad \text{Math Figure 1}$$

where K is given by the system information.

The UE finds out the index of the HS-SCCH using the above equation and acquires setup information of a pertinent HS-SCCH from the index calculated based on the system information. The UE sets up the HS-SCCH based on the acquired setup information.

The UE monitors the selected HS-SCCH (S240).

If it is instructed that the UE receives the message on the HS-DSCH using the HS-SCCH, the UE receives a RRC connection setup message on the HS-DSCH (S250). In other words, if the UE receives a selected shared control channel periodically and receives a message indicating the use of a shared data channel through a shared control channel, it receives the message through the shared data channel according to an instruction.

The above RRC connection setup process can be used in a cell updating process. In the cell updating process, the RRC connection request message corresponds to a cell updating message and the RRC connection setup message corresponds to a cell updating confirm message.

A method of performing paging is described below. Paging refers to the act of calling one or more UEs in order for a network to perform a specific purpose. Paging also has a function of not allowing a UE to wake up except for when necessary in order to save power of the UE as well as the function of allowing a network to find out a specific UE. That is, a UE is in a sleeping mode at normal times, but wakes up when paging is received from a network and then performs an act required by the network.

Figure 12:
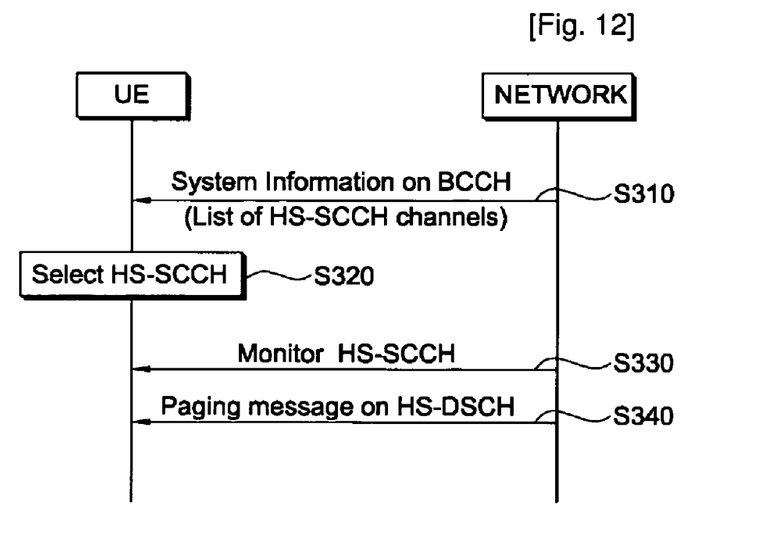
FIG. 12 is a flowchart illustrating a method of performing a paging procedure according to an embodiment of the present invention.

FIG. 12 is a flowchart illustrating a method of performing a paging procedure according to an embodiment of the present invention.

Referring to FIG. 12, a UE receives system information from a network (S310). The system information can be transmits through a broadcasting channel. The system information includes information about a plurality of HS-SCCHs. The UE can acquire information about the plurality of HS-SCCHs based on the system information.

The UE selects one or more HS-SCCHs, which must be monitored, of a plurality of HS-SCCHs using its UE identity in order to receive a paging message through the HS-DSCH (S320). The UE identity may be one of IMSI, TMSI, RNTI and so on. The plurality of HS-SCCHs in the system information received from the network are assigned indices. The UE can find out the indices of the selected HS-SCCHs according to the equation 1. After the UE finds out the indices of the HS-SCCHs, the UE acquires setup information of a pertinent HS-SCCH from the indices calculated based on the system information. The UE sets up the HS-SCCH based on the acquired setup information.

The UE monitors the selected HS-SCCH (S330).

If it is instructed that the UE receives the message on the HS-DSCH using the HS-SCCH, the UE receives a paging message on the HS-DSCH (S340). The UE receives the paging message through the HS-DSCH in the CELL_PCH or URA_PCH state.

The functions described in connection with the embodiments disclosed herein can be performed by a microprocessor, a controller, a micro-controller, or a processor such as an Application Specific Integrated Circuit (ASIC) according to software, a program code or the like, which is coded to perform the above functions. It can be understood that design, development and implementation of the code are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of performing, by a user equipment, a radio resource control (RRC) procedure in a wireless communication system, comprising:
receiving system information including information about a plurality of high speed shared control channels (HS-SCCHs) from a network, the HS-SCCH being a high speed physical channel for transmitting control information regarding the reception of data through a shared data channel;
transmitting a RRC connection request message to the network;
selecting at least one of the plurality of HS-SCCHs using a user equipment (UE) identity, the selected HS-SCCH having an index of:
the UE identity mod K,
where K is given by the system information;
monitoring the selected HS-SCCH periodically;
receiving an instruction message indicating the use of the shared data channel through the selected HS-SCCH from the network; and
receiving a RRC connection setup message through the shared data channel according to the instruction message from the network.

2. The method of claim 1, wherein the system information is received through a broadcasting channel.

3. The method of claim 1, wherein the shared data channel is a High Speed-Downlink Shared Channel (HS-DSCH).

4. The method of claim 1, wherein the UE identity is one of International Mobile Station Identity (IMSI), Temporary Mobile Subscriber Identity (TMSI) and Radio Network Temporary Identity (RNTI).

5. The method of claim 1, further comprising transmitting a random access preamble on a random access channel (RACH) to request radio resources for the transmission of the RRC connection request message before transmitting the RRC connection request message.

* * * * *